US012646867B2

(12) United States Patent
Komoto

(10) Patent No.: US 12,646,867 B2
(45) Date of Patent: Jun. 2, 2026

(54) CONNECTOR AND CONNECTOR ASSEMBLY

(71) Applicant: Japan Aviation Electronics Industry, Limited, Tokyo (JP)

(72) Inventor: Tetsuya Komoto, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 366 days.

(21) Appl. No.: 18/529,278

(22) Filed: Dec. 5, 2023

(65) Prior Publication Data

US 2024/0283172 A1 Aug. 22, 2024

(30) Foreign Application Priority Data

Feb. 16, 2023 (JP) ................................ 2023-022654

(51) Int. Cl.
*H01R 9/24* (2006.01)
*H01R 13/639* (2006.01)

(52) U.S. Cl.
CPC ......... *H01R 9/2416* (2013.01); *H01R 13/639* (2013.01)

(58) Field of Classification Search
CPC ...... H01R 9/2416; H01R 13/639; H01R 4/48; H01R 11/09
USPC ........................................ 439/387, 786, 787
See application file for complete search history.

(56) References Cited

U.S. PATENT DOCUMENTS 3,516,047 A * 6/1970 Young .................. H01R 13/115 439/786
4,902,252 A * 2/1990 Whorton ................ H01R 13/53 439/786
6,132,238 A * 10/2000 Hartmann ............ H01R 4/4821 439/787
8,192,226 B2 * 6/2012 Keswani ................ H01R 4/485 439/441
11,258,189 B2 * 2/2022 Hashiguchi .......... H01R 13/502

FOREIGN PATENT DOCUMENTS

JP 2007214087 A 8/2007

* cited by examiner

*Primary Examiner* — Gary F Paumen
(74) *Attorney, Agent, or Firm* — MUNCY, GEISSLER, OLDS & LOWE, P.C.

(57) ABSTRACT

A connector includes a first connector portion having an electric wire retaining portion and a locking projection, and a second connector portion having a connecting spring member and a locking spring member, the electric wire extending along a first direction, the connecting spring member and the locking spring member being disposed at a predetermined interval in a second direction, when the second connector portion is fitted to the first connector portion having the electric wire retained in the electric wire retaining portion with a sheet type conductive member being interposed therebetween, a flexible conductor of the sheet type conductive member being pressed against a conductor portion of the electric wire by the connecting spring member and electrically connected to the conductor portion, and the locking spring member catching on the locking projection.

14 Claims, 14 Drawing Sheets

CONNECTOR AND CONNECTOR ASSEMBLY

BACKGROUND OF THE INVENTION

The present invention relates to a connector, particularly to a connector connecting a conductor portion of an electric wire to a flexible conductor of a sheet type conductive member.

The present invention also relates to a connector assembly in which a conductor portion of an electric wire is connected to a flexible conductor of a sheet type conductive member by means of the connector.

In recent years, attention has been drawn to so-called smart clothes that can obtain user's biological data such as the heart rate and the body temperature only by being worn by the user. Such smart clothes have an electrode disposed at a measurement site and constituted of a flexible conductor, and when a wearable device serving as a measurement device is electrically connected to the electrode, biological data can be transmitted to the wearable device.

The electrode and the wearable device can be interconnected by, for instance, use of a connector connected to the flexible conductor.

However, when the wearable device is situated away from the measurement site, it is necessary to provide an electric path connecting the electrode disposed at the measurement site to the place where the connector is attached, and if such an electric path is formed from a flexible conductor, the electric resistance would increase, and the cost would also increase.

To interconnect an electrode constituted of a flexible conductor and a wearable device by use of an electric wire that has low electric resistance and is inexpensive, it has been desired to develop a small-sized connector connecting the electric wire to the flexible conductor disposed on a garment.

As a connector for connecting an electric wire to a flexible conductor, for instance, JP 2007-214087 A discloses a connector as shown in FIG. 33. This connector includes: a first connector 2 connected to an end of a sheet type conductive member 1; and a second connector 4 attached to tips of electric wires 3. The electric wires 3 can be connected to a flexible conductor of the sheet type conductive member 1 by fitting a box-shaped housing of the second connector 4 to a box-shaped housing of the first connector 2.

However, it is necessary to fit together the first connector 2 and the second connector 4 each having the box-shaped housing in order to connect the electric wires 3 to the flexible conductor of the sheet type conductive member 1, and this causes a larger size of a device; and there is a separatable connection portion between the first connector 2 and the second connector 4, which impairs the reliability of electric connection.

SUMMARY OF THE INVENTION

The present invention has been made to solve the conventional problem described above and aims at providing a connector and a connector assembly that can be smaller in size while reliably connecting a conductor portion of an electric wire to a flexible conductor of a sheet type conductive member.

A connector according to the present invention is one connecting a conductor portion of an electric wire to a flexible conductor of a sheet type conductive member, the connector comprising:

a first connector portion including an electric wire retaining portion used to retain the electric wire, and a locking projection; and a second connector portion including a connecting spring member corresponding to the electric wire retained by the electric wire retaining portion, and a locking spring member corresponding to the locking projection, wherein the electric wire extends along a first direction, the connecting spring member and the locking spring member are disposed at a predetermined interval in a second direction perpendicular to the first direction, and when the second connector portion is fitted to the first connector portion having the electric wire retained in the electric wire retaining portion with the sheet type conductive member being interposed between the second connector portion and the first connector portion, the flexible conductor of the sheet type conductive member is pressed against the conductor portion of the electric wire by the connecting spring member and electrically connected to the conductor portion, and the locking spring member catches on the locking projection so that a fitting state between the first connector portion and the second connector portion is locked.

DETAILED DESCRIPTION OF THE INVENTION

Embodiments of the present invention are described below based on the accompanying drawings.

Embodiment 1

Figure 1:
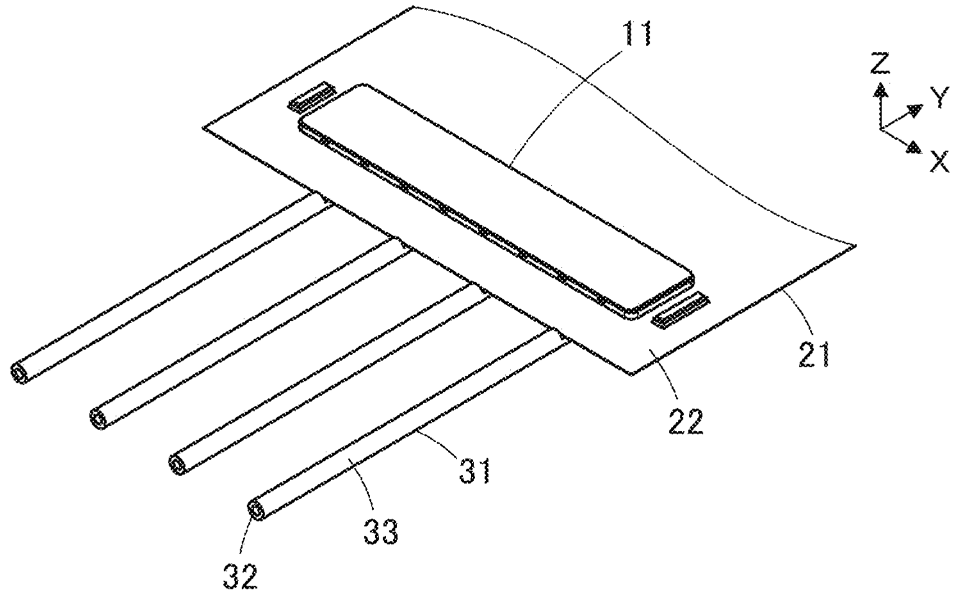
FIG. 1 is a perspective view showing a connector assembly using a connector according to Embodiment 1.

FIG. 1 shows a connector assembly using a connector 11 according to Embodiment 1. The connector assembly is obtained by connecting conductor portions 32 of a plurality of coated electric wires 31 to a sheet type conductive member 21 by means of a connector 11.

The sheet type conductive member 21 includes a sheet type insulating substrate 22, and a plurality of flexible conductors to be described later are formed on the bottom surface of the insulating substrate 22.

The coated electric wires 31 are arranged in a predetermined arrangement direction and each extend in a direction perpendicular to the arrangement direction in parallel to the top surface of the sheet type conductive member 21. Each coated electric wire 31 has a structure in which the outer periphery of the conductor portion 32 is covered with an insulating coating portion 33. The conductor portions 32 of the coated electric wires 31 are electrically connected to the flexible conductors of the sheet type conductive member 21 by means of the connector 11. The conductor portion 32 of the coated electric wire 31 may be either a so-called solid wire constituted of one conductor or a so-called stranded wire constituted of plural conductors being stranded.

For convenience, the sheet type conductive member 21 is defined as extending along an XY plane, the predetermined arrangement direction of the coated electric wires 31 is referred to as "X direction (second direction)," the direction in which each coated electric wire 31 extends toward the connector 11 is referred to as "+Y direction (first direction)," and the direction orthogonal to an XY plane is referred to as "Z direction."

Figure 2:
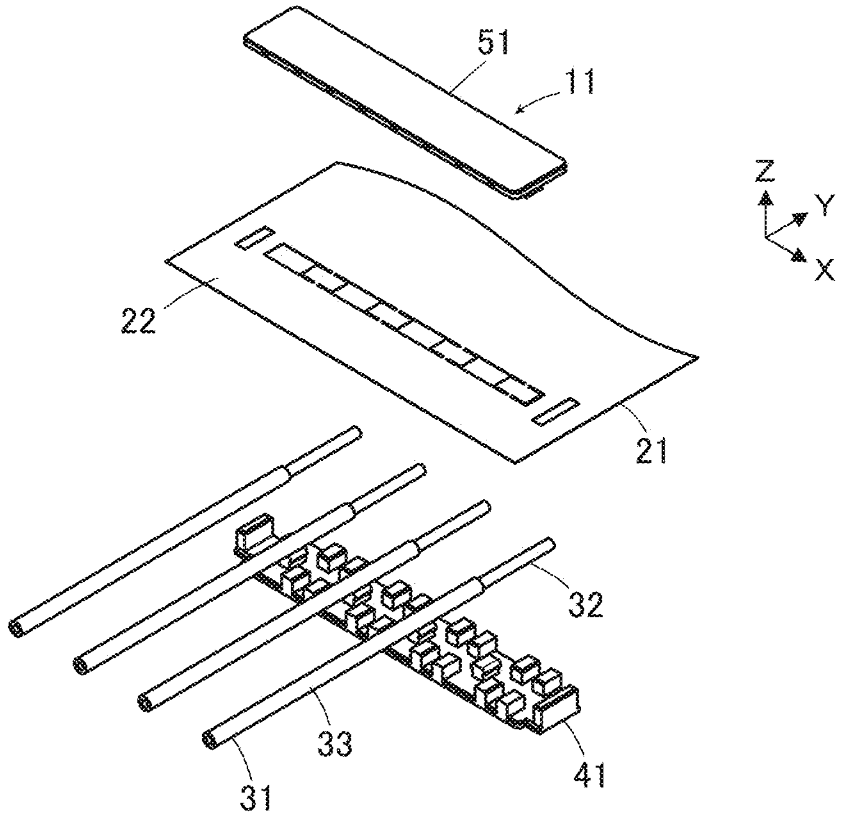
FIG. 2 is an assembly view of the connector assembly using the connector according to Embodiment 1 when viewed from an obliquely upper position.
Figure 3:
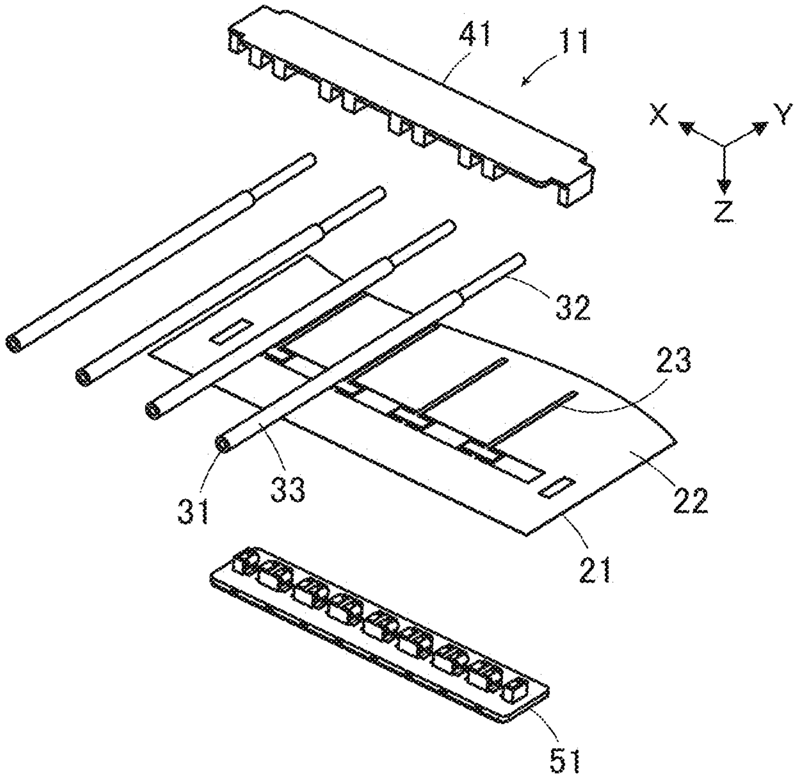
FIG. 3 is an assembly view of the connector assembly using the connector according to Embodiment 1 when viewed from an obliquely lower position.

FIGS. 2 and 3 show assembly views of the connector assembly.

The connector 11 is formed of a first connector portion 41 disposed on the −Z direction side of the sheet type conductive member 21 and a second connector portion 51 disposed on the +Z direction side of the sheet type conductive member 21. The first connector portion 41 faces the bottom surface of the sheet type conductive member 21, while the second connector portion 51 faces the top surface of the sheet type conductive member 21.

The conductor portions 32 drawn from the insulating coating portions 33 of the coated electric wires 31 are disposed between the bottom surface of the sheet type conductive member 21 and the first connector portion 41.

As shown in FIG. 3, the flexible conductors 23 corresponding to the coated electric wires 31 are exposed on the bottom surface of the sheet type conductive member 21 facing the first connector portion 41.

Figure 4:
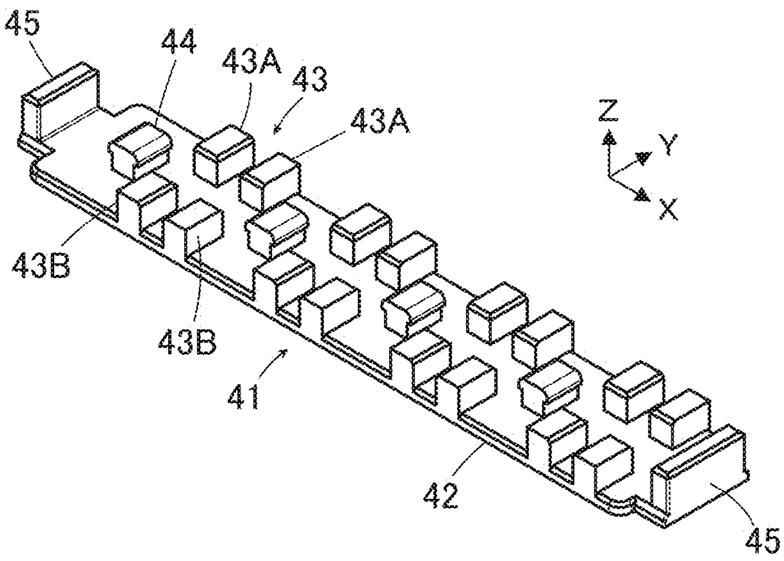
FIG. 4 is a perspective view showing a first connector portion used in the connector according to Embodiment 1.

FIG. 4 shows the structure of the first connector portion 41. The first connector portion 41 is constituted of a first insulator made of an insulating resin material and includes a flat plate portion 42 of rectangular shape extending along an XY plane. A plurality of electric wire retaining portions 43 and a plurality of locking projections 44 are arranged alternately in the X direction on the top surface, on the +Z direction side, of the flat plate portion 42. The electric wire retaining portions 43 correspond to the coated electric wires 31.

Each electric wire retaining portion 43 includes: a pair of retaining projections 43A formed to project on the top surface of the flat plate portion 42 so as to face each other in the X direction (second direction) on the +Y direction side of the flat plate portion 42; and a pair of retaining projections 43B formed to project on the top surface of the flat plate portion 42 so as to face each other in the X direction (second direction) on the −Y direction side of the flat plate portion 42. Those retaining projections 43A and 43B have the same prismatic shape and the same size.

The locking projections 44 are formed to project on the top surface of the flat plate portion 42 at positions spaced from the electric wire retaining portions 43 in the X direction and in a middle portion, in the Y direction, of the flat plate portion 42, and have a substantially prismatic shape.

The flat plate portion 42 is provided at its opposite ends in the X direction with a pair of positioning projections 45 projecting in the +Z direction. The positioning projections 45 have a Z directional height larger than that of the retaining projections 43A and 43B and the locking projections 44.

Figure 5:
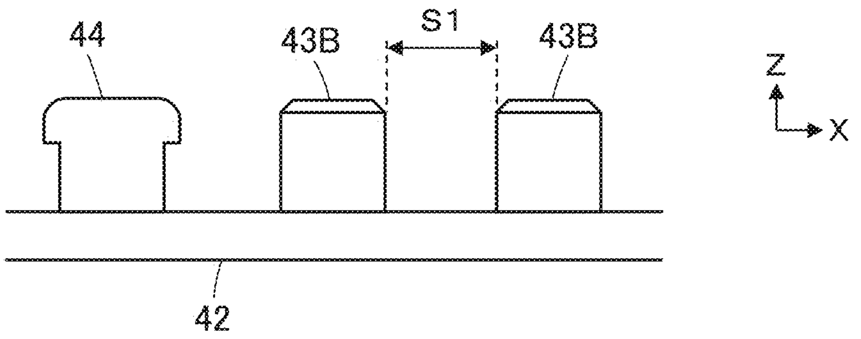
FIG. 5 is a partial front view showing the first connector portion.

As shown in FIG. 5, a distance S1 between the pair of retaining projections 43B in the X direction is formed to be slightly smaller than the diameter of the conductor portion 32 of the coated electric wire 31, and the coated electric wire 31 is retained by the pair of retaining projections 43B when the conductor portion 32 of the coated electric wire 31 is pushed in between the pair of retaining projections 43B from the +Z direction.

Likewise, a distance between the pair of retaining projections 43A in the X direction is formed to be slightly smaller than the diameter of the conductor portion 32 of the coated electric wire 31, so that the pair of retaining projections 43A can retain the coated electric wire 31.

The +Z directional end of the locking projection 44 is provided with a pair of overhanging portions 44A overhanging in the +X and −X directions.

Figure 6:
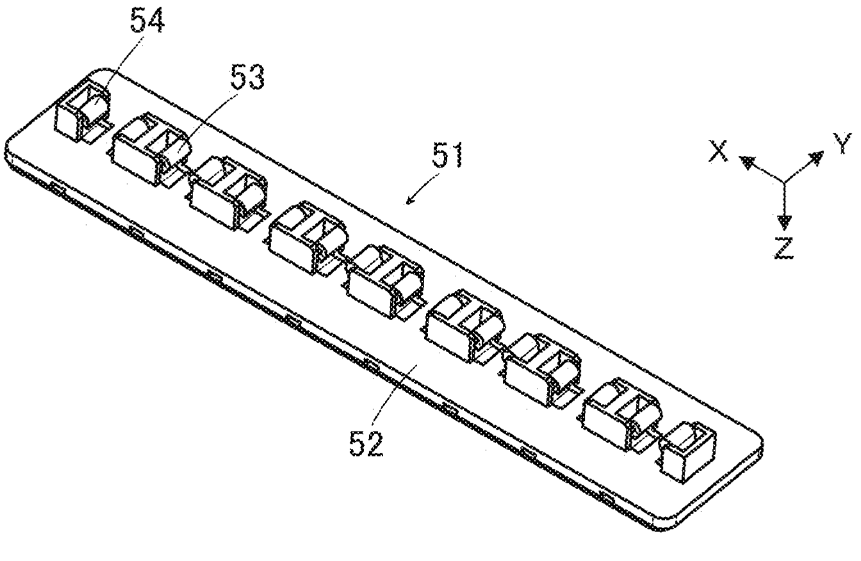
FIG. 6 is a perspective view of a second connector portion used in the connector according to Embodiment 1 when viewed from an obliquely lower position.

FIG. 6 shows the structure of the second connector portion 51. The second connector portion 51 includes a second insulator 52 made of an insulating resin material. A plurality of connecting spring members 53 and a plurality of locking spring members 54 are retained in the second insulator 52 to be alternately arranged at predetermined intervals in the X direction. The connecting spring members 53 correspond to the coated electric wires 31.

Figure 7:
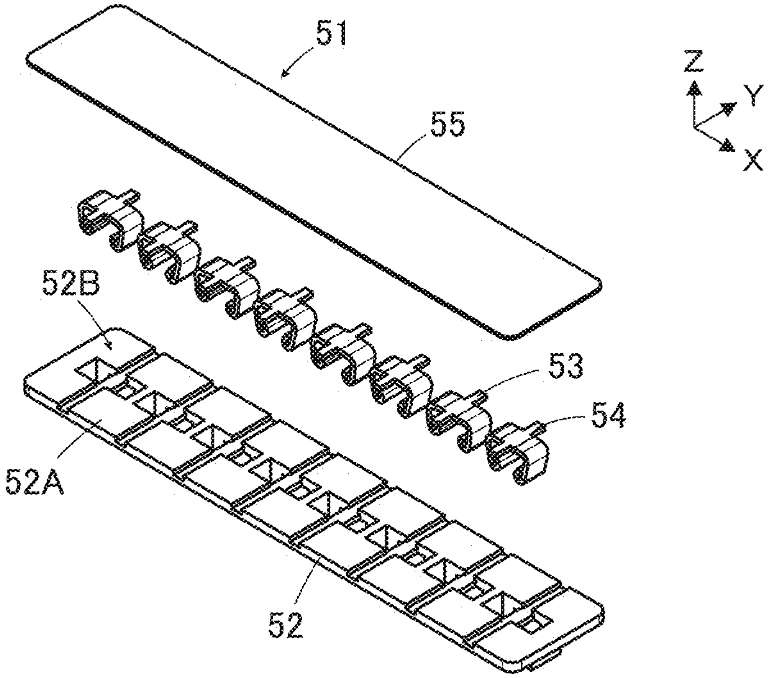
FIG. 7 is an assembly view of the second connector portion used in the connector according to Embodiment 1 when viewed from an obliquely upper position.
Figure 8:
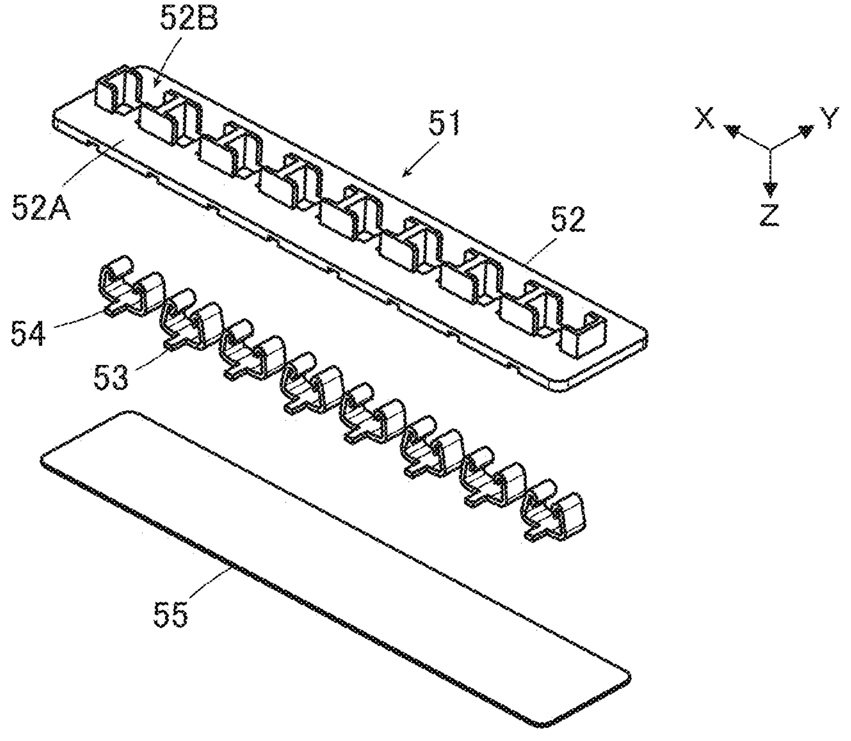
FIG. 8 is an assembly view of the second connector portion used in the connector according to Embodiment 1 when viewed from an obliquely lower position.

FIGS. 7 and 8 show assembly views of the second connector portion 51. The connecting spring members 53 and the locking spring members 54 are disposed on the +Z direction side of the second insulator 52, and an insulating sheet 55 is disposed on the +Z direction side of the connecting spring members 53 and the locking spring members 54. The insulating sheet 55 is attached to the top surface, on the +Z direction side, of the second insulator 52 to thereby retain the connecting spring members 53 and the locking spring members 54 in the second insulator 52.

The second insulator 52 includes a flat plate portion 52A of rectangular shape extending along an XY plane and a plurality of spring member attachment portions 52B formed to be arranged in the X direction in the flat plate portion 52A. The spring member attachment portions 52B are used to attach the connecting spring members 53 and the locking spring members 54 to the second insulator 52 and all have the same structure without distinguishing between the connecting spring members 53 and the locking spring members 54.

Figure 9:
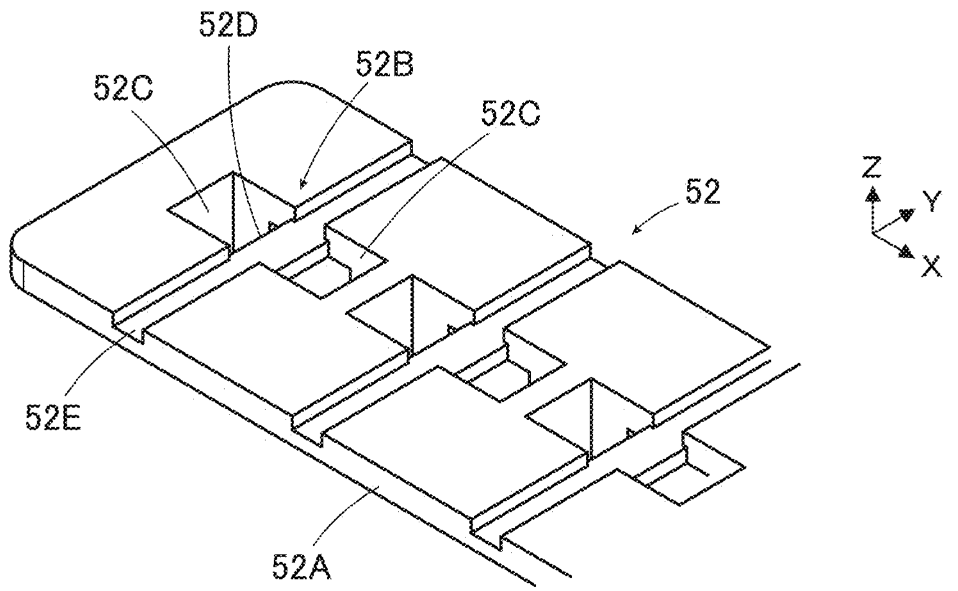
FIG. 9 is a partial perspective view of a second insulator of the second connector portion when viewed from an obliquely upper position.

As shown in FIG. 9, each spring member attachment portion 52B includes: a pair of through-holes 52C disposed to be spaced from each other in the X direction and penetrating the flat plate portion 52A in the Z direction; a communication portion 52D disposed between the pair of through-holes 52C and extending in the Y direction; and a groove portion 52E formed at the top surface, on the +Z direction side, of the flat plate portion 52A and traversing the flat plate portion 52A in the Y direction along the communication portion 52D. The top surface, on the +Z direction side, of the communication portion 52D forms the same plane with the bottom surface of the groove portion 52E.

Figure 10:
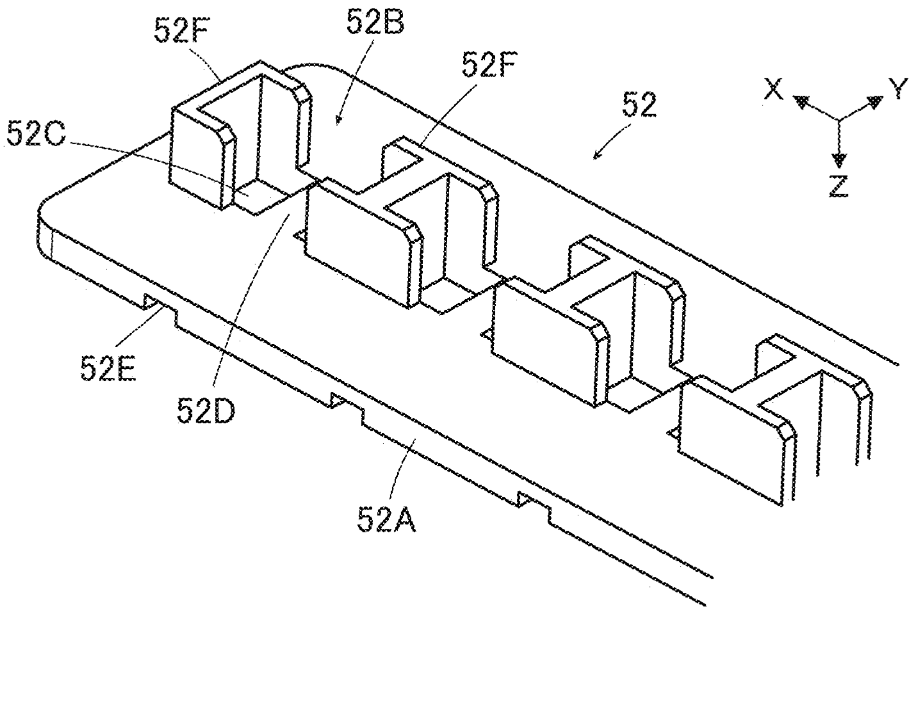
FIG. 10 is a partial perspective view of the second insulator of the second connector portion when viewed from an obliquely lower position.

As shown in FIG. 10, each spring member attachment portion 52B further includes a pair of outer wall portions 52F corresponding to the pair of through-holes 52C, the pair of outer wall portions 52F protruding in the −Z direction on the bottom surface, on the −Z direction side, of the flat plate portion 52A. The pair of outer wall portions 52F each have a U shape such that the pair of outer wall portions 52F surround a +X directional portion and −X directional portion of the pair of through-holes 52C when seen from the −Z direction.

Figure 11:
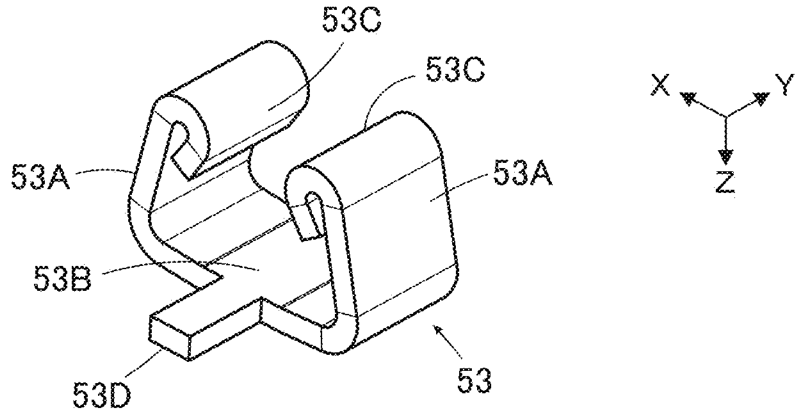
FIG. 11 is a perspective view of a connecting spring member of the second connector portion when viewed from an obliquely lower position.

FIG. 11 shows the structure of the connecting spring member 53. The connecting spring member 53 is formed of a bent metal plate and includes: a pair of spring pieces 53A facing each other in the X direction and being elastically deformable at least in the X direction; and a joint portion 53B extending along an XY plane and joining the pair of spring pieces 53A together. The pair of spring pieces 53A protrude in the −Z direction from the joint portion 53B and are provided at their −Z directional ends with a pair of pressing portions 53C that face each other in the X direction. Protrusion portions 53D extend from the opposite ends, in the Y direction, of the joint portion 53B to protrude in the opposite directions from each other along the Y direction.

Figure 12:
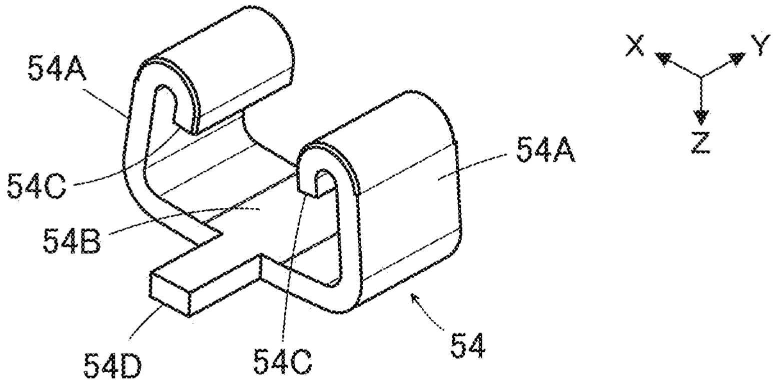
FIG. 12 is a perspective view of a locking spring member of the second connector portion when viewed from an obliquely lower position.

FIG. 12 shows the structure of the locking spring member 54. The locking spring member 54 is formed of a bent metal plate and includes: a pair of lock pieces 54A facing each other in the X direction and being elastically deformable in the X direction; and a joint portion 54B extending along an XY plane and joining the pair of lock pieces 54A together. The pair of lock pieces 54A protrude in the −Z direction from the joint portion 54B. A pair of hook portions 54C facing the +Z direction are formed by bending the −Z directional ends of the pair of lock pieces 54A toward the +Z direction and inward within the locking spring member 54. Protrusion portions 54D extend from the opposite ends, in the Y direction, of the joint portion 54B to protrude in the opposite directions from each other along the Y direction.

The pair of spring pieces 53A of the connecting spring member 53 and the pair of lock pieces 54A of the locking spring member 54 are sized to penetrate through the pair of through-holes 52C of the second insulator 52, and the protrusion portions 53D of the connecting spring member 53 and the protrusion portions 54D of the locking spring member 54 are sized to be inserted in the groove portion 52E of the second insulator 52.

Figure 13:
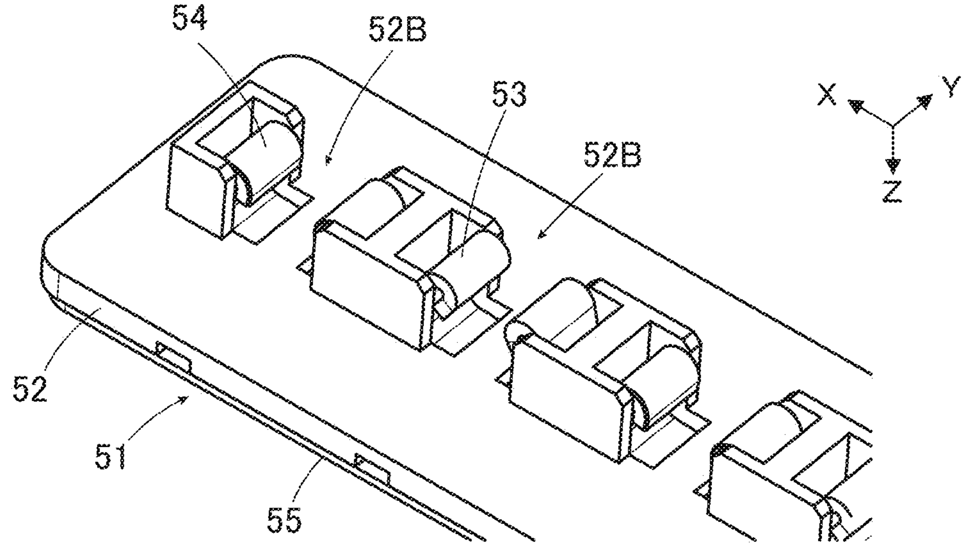
FIG. 13 is a partial perspective view of the second connector portion when viewed from an obliquely lower position.

When the second connector portion 51 is assembled, the pairs of spring pieces 53A of the connecting spring members 53 are passed through the pairs of through-holes 52C of the corresponding spring member attachment portions 52B of the second insulator 52 from the +Z direction, and likewise, the pairs of lock pieces 54A of the locking spring members 54 are passed through the pairs of through-holes 52C of the corresponding spring member attachment portions 52B of the second insulator 52 from the +Z direction. In addition, the insulating sheet 55 is attached to the top surface, on the +Z direction side, of the second insulator 52 with the protrusion portions 53D and 54D of the connecting spring members 53 and the locking spring members 54 being inserted in the groove portions 52E of the corresponding spring member attachment portions 52B of the second insulator 52. Thus, the second connector portion 51 having the connecting spring members 53 and the locking spring members 54 attached to the second insulator 52 can be assembled as shown in FIG. 13.

Figure 14:
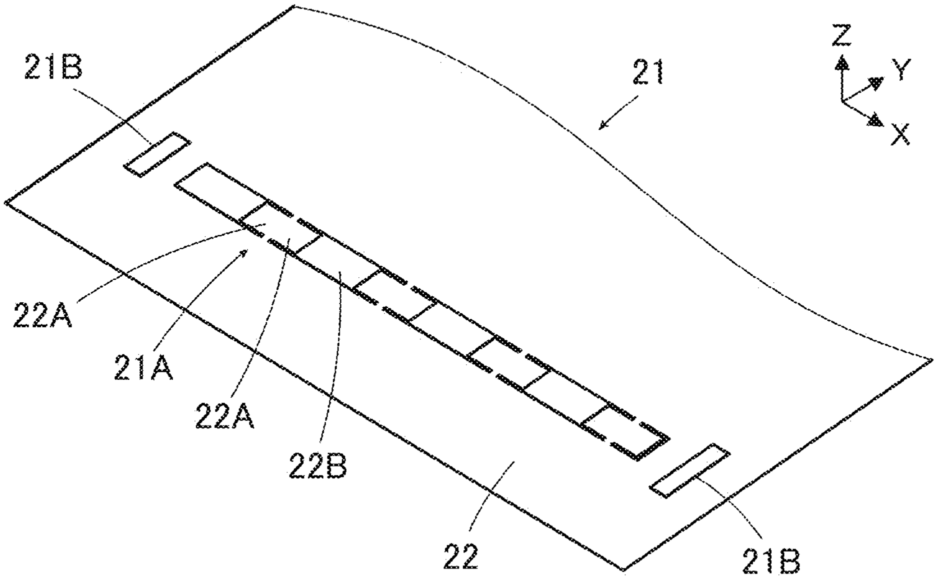
FIG. 14 is a partial perspective view of a sheet type conductive member applied to the connector according to Embodiment 1, when viewed from an obliquely upper position.

FIG. 14 shows the structure of the sheet type conductive member 21. A plurality of electric wire connection portions 21A arranged in the X direction are formed in the vicinity of the −Y directional end of the sheet type conductive member 21. The electric wire connection portions 21A correspond to the coated electric wires 31 and each have a pair of protrusion pieces 22A formed by cutting out the insulating substrate 22 of the sheet type conductive member 21. The pair of protrusion pieces 22A protrude in the opposite directions from each other in the X direction. An opening portion 22B penetrating the sheet type conductive member 21 in the Z direction is formed between protrusion pieces 22A of adjacent electric wire connection portions 21A.

Figure 15:
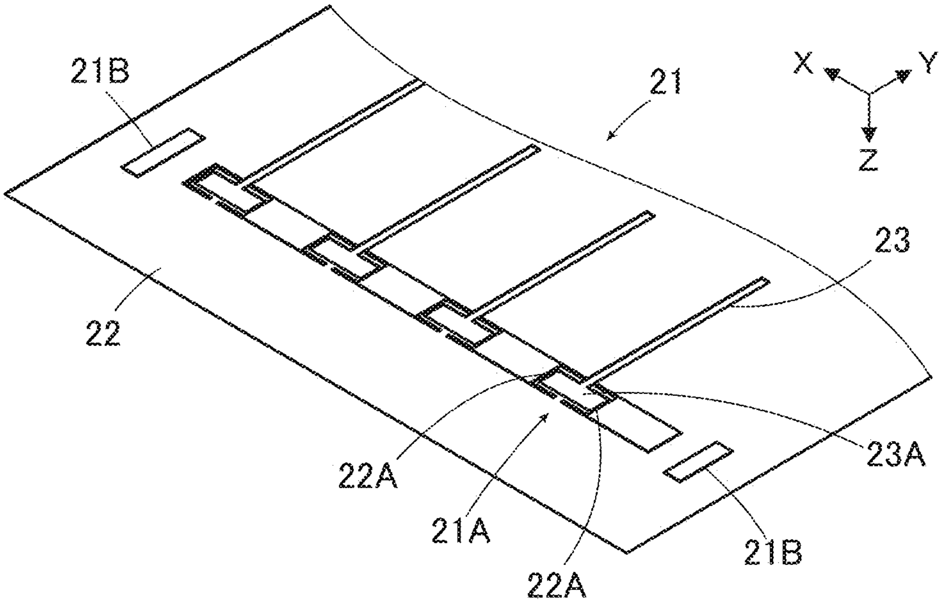
FIG. 15 is a partial perspective view of the sheet type conductive member applied to the connector according to Embodiment 1, when viewed from an obliquely lower position.

As shown in FIG. 15, a contacting portion 23A is formed by the flexible conductor 23 being exposed on the bottom surface, facing the −Z direction, of the pair of protrusion pieces 22A of each electric wire connection portion 21A.

The sheet type conductive member 21 is further provided with a pair of positioning holes 21B penetrating the sheet type conductive member 21 in the Z direction on the +X direction side and the −X direction side of the electric wire connection portions 21A arranged in the X direction.

Figure 16:
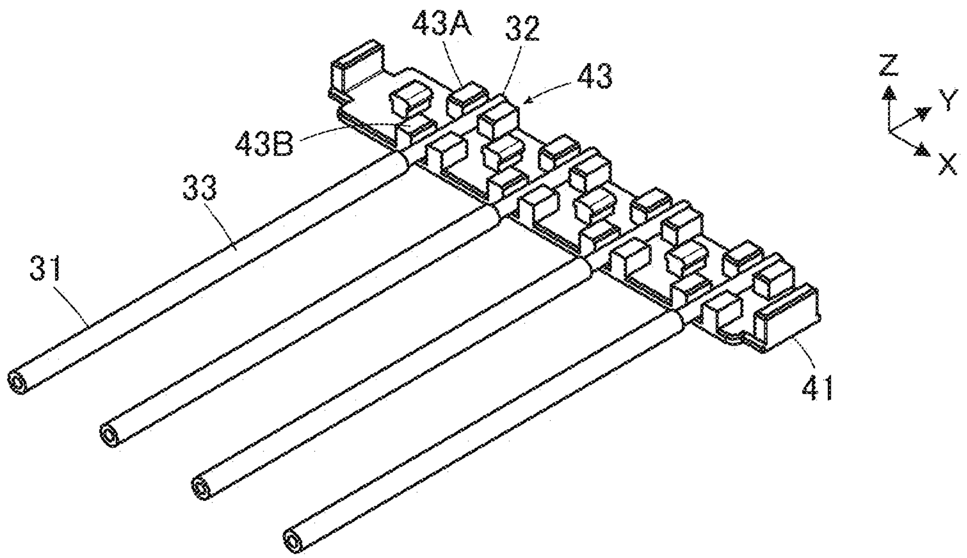
FIG. 16 is a perspective view showing the state where a plurality of electric wires are disposed on the first connector portion according to Embodiment 1.

When the connector assembly is assembled, first, the conductor portions 32 drawn from the insulating coating portions 33 of the coated electric wires 31 are separately retained in the corresponding electric wire retaining portions 43 of the first connector portion 41 as shown in FIG. 16. More specifically, each conductor portion 32 is pushed in between the pair of retaining projections 43A and between the pair of retaining projections 43B of the corresponding electric wire retaining portion 43 from the +Z direction and thus retained in the electric wire retaining portion 43.

Figure 17:
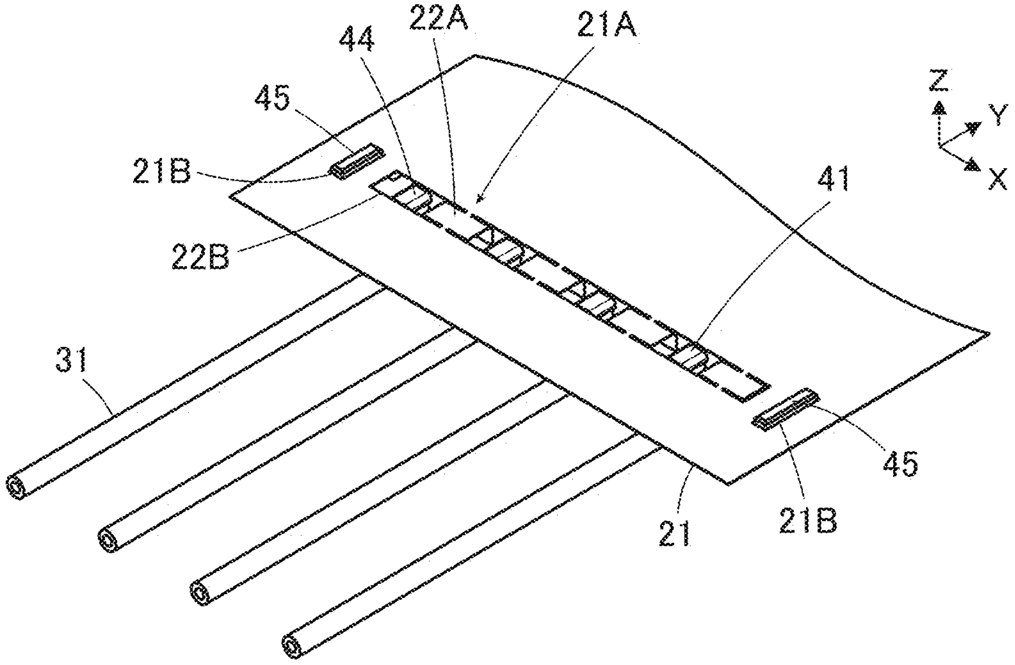
FIG. 17 is a perspective view showing the state where the sheet type conductive member is disposed on the first connector portion according to Embodiment 1 on which the electric wires are disposed.

Next, the sheet type conductive member 21 is disposed on the first connector portion 41 from the +Z direction as shown in FIG. 17. In this process, the pair of positioning projections 45 of the first connector portion 41 are passed through the pair of positioning holes 21B of the sheet type conductive member 21, whereby the sheet type conductive member 21 is positioned with respect to the first connector portion 41. In other words, the pair of protrusion pieces 22A in each of the electric wire connection portions 21A of the sheet type conductive member 21 are disposed above a place between the pair of retaining projections 43A on the +Y direction side and the pair of retaining projections 43B on the −Y direction side in the corresponding electric wire retaining portion 43 of the first connector portion 41.

Figure 18:
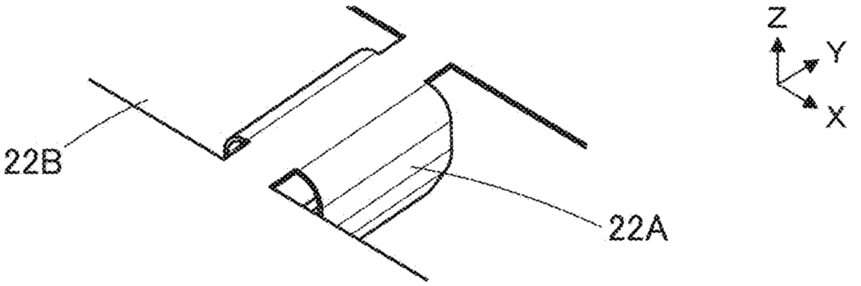
FIG. 18 is a perspective view of a main part of the sheet type conductive member when the second connector portion is fitted to the first connector portion, as viewed from an obliquely upper position.
Figure 19:
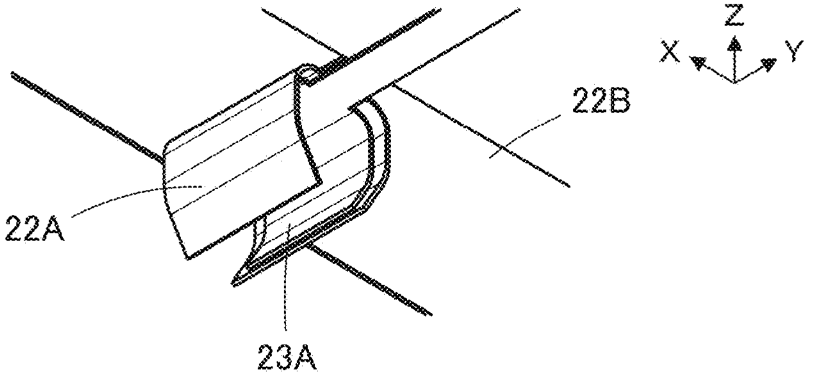
FIG. 19 is a perspective view of the main part of the sheet type conductive member when the second connector portion is fitted to the first connector portion, as viewed from an obliquely lower position.

In this state, the second connector portion 51 is moved from the +Z direction toward the first connector portion 41 and the sheet type conductive member 21 and fitted to the first connector portion 41. In this process, each of the connecting spring members 53 of the second connector portion 51 is inserted between the pair of retaining projections 43A on the +Y direction side and the pair of retaining projections 43B on the −Y direction side in the corresponding electric wire retaining portion 43 of the first connector portion 41 while pushing the pair of protrusion pieces 22A in the corresponding electric wire connection portion 21A of the sheet type conductive member 21 in the −Z direction. The pair of protrusion pieces 22A in the corresponding electric wire connection portion 21A of the sheet type conductive member 21 are pushed in the −Z direction by the pair of spring pieces 53A of the connecting spring member 53 of the second connector portion 51, whereby the pair of protrusion pieces 22A and the contacting portion 23A exposed on the bottom surface of those protrusion pieces 22A are bent toward the −Z direction as shown in FIGS. 18 and 19.

In addition, the pair of lock pieces 54A of each of the locking spring members 54 of the second connector portion 51 catch on the corresponding locking projection 44 of the first connector portion 41 through the corresponding opening portion 22B of the sheet type conductive member 21.

Thus, the second connector portion 51 is fitted to the first connector portion 41, and the assembling operation of the connector assembly is completed.

Figure 20:
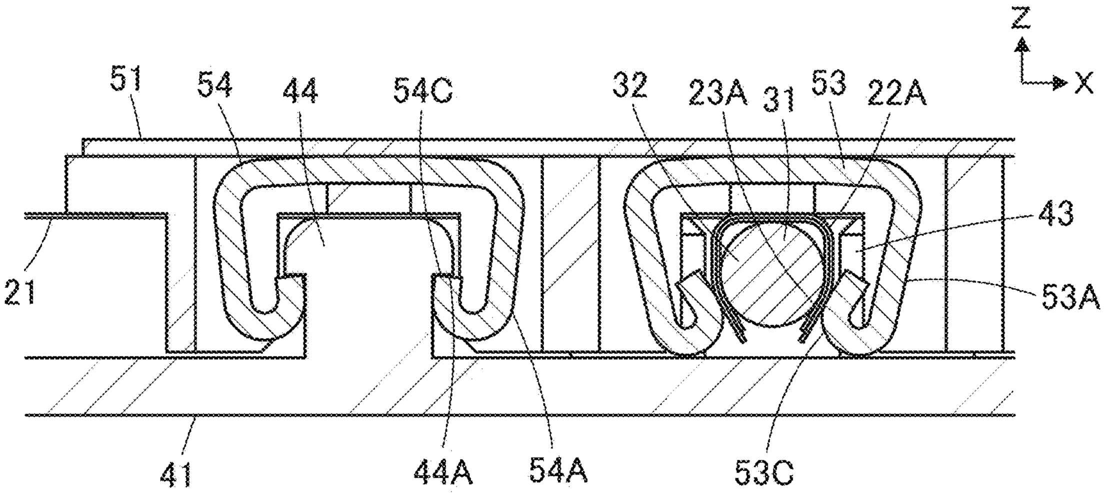
FIG. 20 is a partial cross-sectional view of the connector assembly using the connector according to Embodiment 1.

FIG. 20 shows the inside of the connector assembly 20. The contacting portion 23A exposed on the bottom surface of the pair of protrusion pieces 22A of the sheet type conductive member 21 having been pushed in the −Z direction by the pair of spring pieces 53A of the connecting spring member 53 of the second connector portion 51 is, by the pair of pressing portions 53C of the connecting spring member 53, pressed against the conductor portion 32 of the coated electric wire 31 retained by the electric wire retaining portion 43 of the first connector portion 41. Consequently, the contacting portion 23A of the sheet type conductive member 21 makes contact with the conductor portion 32 of the coated electric wire 31 at a predetermined contact pressure and is electrically connected thereto.

Meanwhile, as shown in FIG. 20, a −Z directional portion of the conductor portion 32 of the coated electric wire 31 is diagonally pushed in the X direction and the +Z direction by the pair of pressing portions 53C of the connecting spring member 53 via the pair of protrusion pieces 22A of the sheet type conductive member 21; accordingly, +Z directional force acts on the conductor portion 32, so that the +Z directional end of the conductor portion 32 is pressed against the contacting portion 23A of the sheet type conductive member 21. In other words, the conductor portion 32 makes contact with the contacting portion 23A at three points, namely, the +X directional lateral portion and −X directional lateral portion pressed by the pair of pressing portions 53C and also the +Z directional end, thus achieving reliable electrical connection. However, the contact of the +Z directional end of the conductor portion 32 with the contacting portion 23A is not necessarily required.

When the second connector portion 51 is fitted to the first connector portion 41, the pair of lock pieces 54A of the locking spring member 54 of the second connector portion 51 are pressed against the corresponding locking projection 44 of the first connector portion 41 and elastically deform, so that the pair of hook portions 54C catch on the pair of overhanging portions 44A of the locking projection 44.

In this manner, the contacting portions 23A of the electric wire connection portions 21A of the sheet type conductive member 21 are separately pressed against the conductor portions 32 of the coated electric wires 31 retained in the first connector portion 41 by the connecting spring members 53 of the second connector portion 51 and electrically connected to the conductor portions 32.

Aside from that, the locking spring members 54 of the second connector portion 51 alternating with the connecting spring members 53 separately catch on the locking projections 44 of the first connector portion 41, whereby the fitting state between the first connector portion 41 and the second connector portion 51 is locked.

Therefore, the size of the connector 11 can be reduced, while the contacting portions 23A formed of the flexible conductors 23 of the sheet type conductive member 21 are electrically connected to the conductor portions 32 of the coated electric wires 31 with high reliability.

In addition, the flexible conductors 23 of the sheet type conductive member 21 can be electrically connected to the conductor portions 32 of the coated electric wires 31 only by a simple connecting operation in which the conductor portions 32 of the coated electric wires 31 are pushed in the electric wire retaining portions 43 of the first connector portion 41, the sheet type conductive member 21 is disposed on the first connector portion 41, and the second connector portion 51 is fitted to the first connector portion 41 from the top of the sheet type conductive member 21.

It should be noted that the connecting spring member 53 of the second connector portion 51 is inserted between the pair of retaining projections 43A on the +Y direction side and the pair of retaining projections 43B on the −Y direction side in the corresponding electric wire retaining portion 43 of the first connector portion 41; therefore, the conductor portion 32 of the coated electric wire 31 retained by the electric wire retaining portion 43 can be connected to the contacting portion 23A of the sheet type conductive member 21 as long as the conductor portion 32 is drawn from the insulating coating portion 33 at least in a position between the pair of retaining projections 43A on the +Y direction side and the pair of retaining projections 43B on the −Y direction side.

Thus, the conductor portion 32 of the coated electric wire 31 need not be exposed and may be covered with the insulating coating portion 33 in a position pushed in between and retained by the pair of retaining projections 43A on the +Y direction side of the first connector portion 41 and a position pushed in between and retained by the pair of retaining projections 43B on the −Y direction side thereof.

Figure 21:
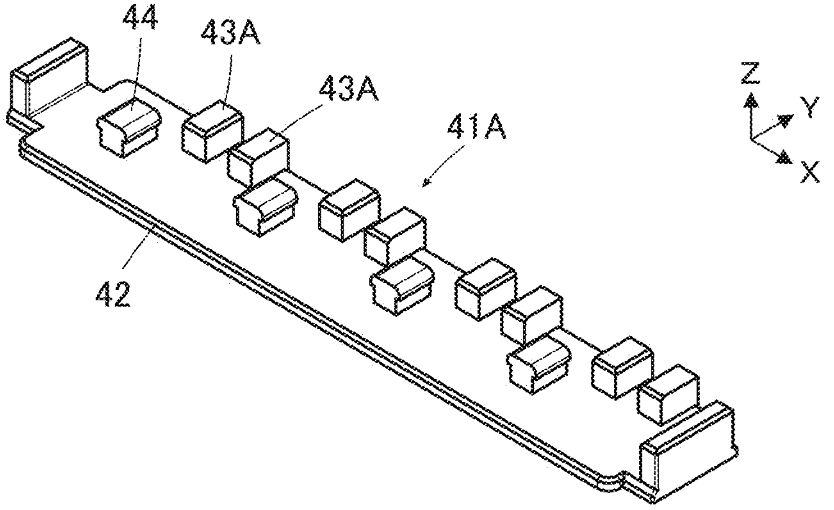
FIG. 21 is a perspective view showing a first connector portion used in a connector according to a modification of Embodiment 1.

In Embodiment 1 above, the electric wire retaining portions 43 of the first connector portion 41 each have the pair of retaining projections 43A disposed on the +Y direction side of the flat plate portion 42 and the pair of retaining projections 43B disposed on the −Y direction side of the flat plate portion 42; however, the invention is not limited thereto. For instance, each electric wire retaining portion may be formed solely of the pair of retaining projections 43A disposed on the +Y direction side of the flat plate portion 42, as in a first connector portion 41A shown in FIG. 21. Even with the first connector portion 41A configured as above, the conductor portions 32 of the coated electric wires 31 can be retained and electrically connected to the contacting portions 23A of the sheet type conductive member 21 in the same manner.

Likewise, each electric wire retaining portion may be formed solely of the pair of retaining projections 43B disposed on the −Y direction side of the flat plate portion 42 in the first connector portion 41 shown in FIG. 4.

Embodiment 2

While the retaining projections 43A and 43B of the first connector portion 41 used in Embodiment 1 above have a prismatic shape projecting in the +Z direction from the top surface of the flat plate portion 42, the invention is not limited thereto.

Figure 22:
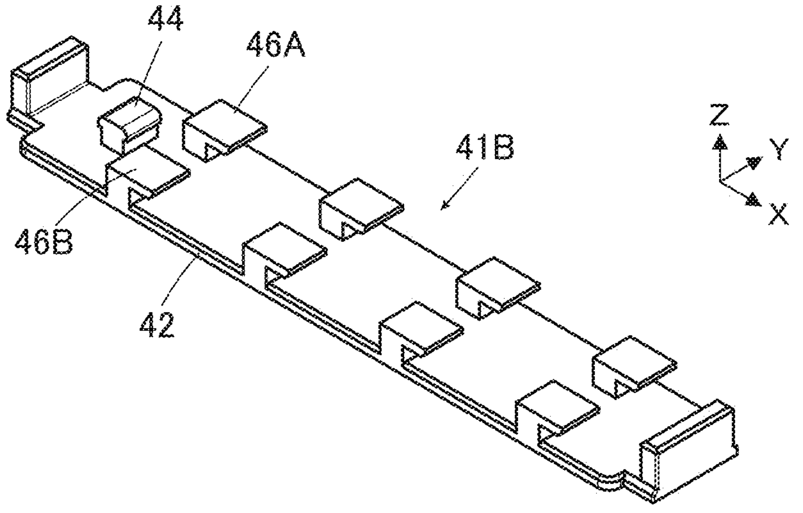
FIG. 22 is a perspective view showing a first connector portion used in a connector according to Embodiment 2.

FIG. 22 shows a first connector portion 41B used in a connector according to Embodiment 2. In the first connector portion 41B, each electric wire retaining portion is formed of a single retaining projection 46A disposed on the +Y direction side of the flat plate portion 42 and a single retaining projection 46B disposed on the −Y direction side of the flat plate portion 42 in place of the pair of retaining projections 43A and the pair of retaining projections 43B that form each electric wire retaining portion 43 in the first connector portion 41 in Embodiment 1 shown in FIG. 4. Otherwise, the configuration is the same as that of the first connector portion 41 in Embodiment 1.

Figure 23:
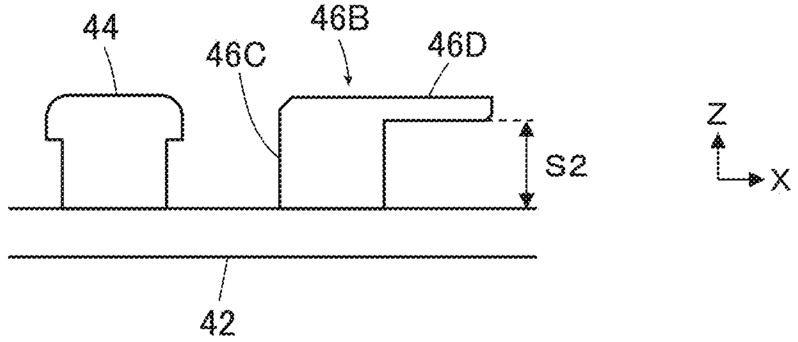
FIG. 23 is a partial front view showing the first connector portion used in the connector according to Embodiment 2.

As shown in FIG. 23, the retaining projection 46B includes: a projection body 46C of prismatic shape projecting in the +Z direction from the surface of the flat plate portion 42; and an arm portion 46D extending in the +X direction from the +Z directional end of the projection body 46C while facing the top surface of the flat plate portion 42. A distance S2 between the arm portion 46D and the top surface of the flat plate portion 42 is formed to be slightly smaller than the diameter of the conductor portion 32 of the coated electric wire 31.

The retaining projection 46A disposed on the +Y direction side of the flat plate portion 42 also has a similar configuration to that of the retaining projection 46B. The conductor portion 32 of the coated electric wire 31 is pushed in between the arm portion 46D of the retaining projection 46B and the top surface of the flat plate portion 42 and between the arm portion 46D of the retaining projection 46A and the surface of the flat plate portion 42 from the +X direction, whereby the coated electric wire 31 can be retained by the retaining projections 46A and 46B.

Even when the first connector portion 41B having the retaining projections 46A and 46B as above is used in place of the first connector portion 41 in Embodiment 1, similarly, a small-sized connector can be obtained, while the contacting portions 23A formed of the flexible conductors 23 of the sheet type conductive member 21 are electrically connected to the conductor portions 32 of the coated electric wires 31 with high reliability.

Figure 24:
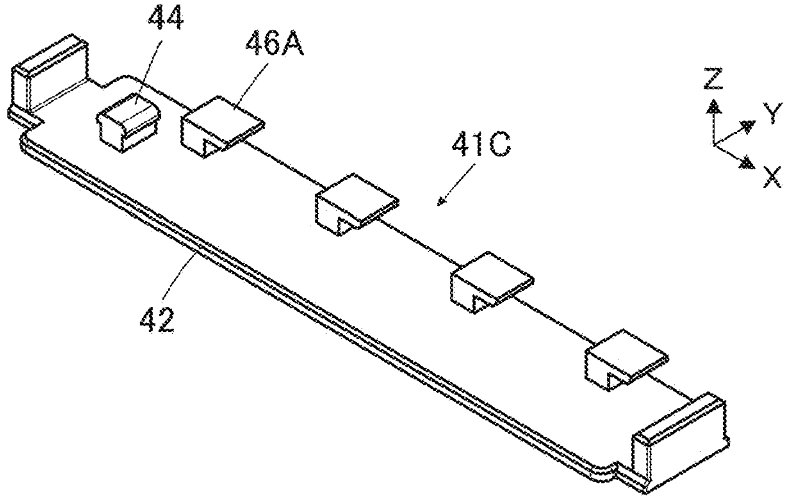
FIG. 24 is a perspective view showing a first connector portion used in a connector according to a modification of Embodiment 2.

In the first connector portion 41B shown in FIG. 22, each electric wire retaining portion has the single retaining projection 46A disposed on the +Y direction side of the flat plate portion 42 and the single retaining projection 46B disposed on the −Y direction side of the flat plate portion 42; however, the invention is not limited thereto. For instance, each electric wire retaining portion may be formed solely of the single retaining projection 46A disposed on the +Y direction side of the flat plate portion 42, as in a first connector portion 41C shown in FIG. 24. Even with the first connector portion 41C configured as above, the conductor portions 32 of the coated electric wires 31 can be retained and electrically connected to the contacting portions 23A of the sheet type conductive member 21 in the same manner.

Likewise, each electric wire retaining portion may be formed solely of the single retaining projection 46B disposed on the −Y direction side of the flat plate portion 42 in the first connector portion 41B shown in FIG. 22.

While four coated electric wires 31 connected to the sheet type conductive member 21 are illustrated in Embodiments 1 and 2 above, the number of the coated electric wires 31 is not limited to four, and the conductor portion(s) 32 of one or more coated electric wires 31 may be connected to the contacting portion(s) 23A formed of the flexible conductor(s) 23 of the sheet type conductive member 21.

Embodiment 3

In the connector 11 of Embodiment 1, the electric wire retaining portions 43 and the locking projections 44 are alternately arranged in the X direction in the first connector portion 41, and also the connecting spring members 53 and the locking spring members 54 are alternately arranged in the X direction in the second connector portion 51. However, the arrangement of the electric wire retaining portions 43 and the locking projections 44 and the arrangement of the connecting spring members 53 and the locking spring members 54 may be modified into various forms.

Arrangement Example 1

Figure 25:
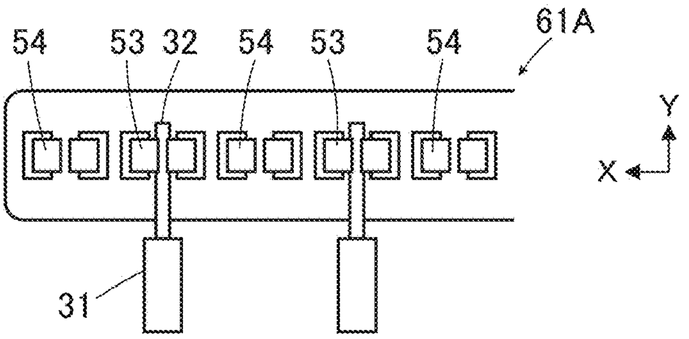
FIG. 25 is a view showing the arrangement of a connector and a plurality of electric wires in Arrangement Example 1 of Embodiment 3.

In a connector 61A shown in FIG. 25, the connecting spring members 53 and the locking spring members 54 are alternately arranged in the X direction in the same manner as in Embodiment 1. Although not shown in FIG. 25, the electric wire retaining portions 43 and the locking projections 44 are also arranged in the X direction to correspond to the connecting spring members 53 and the locking spring members 54.

Since the fitting state of the connector 61A is locked by the locking spring members 54 alternating with the connecting spring members 53, the contacting portions 23A of the sheet type conductive member 21 can be electrically connected to the conductor portions 32 of the coated electric wires 31 by means of the connecting spring members 53 with high reliability.

Arrangement Example 2

Figure 26:
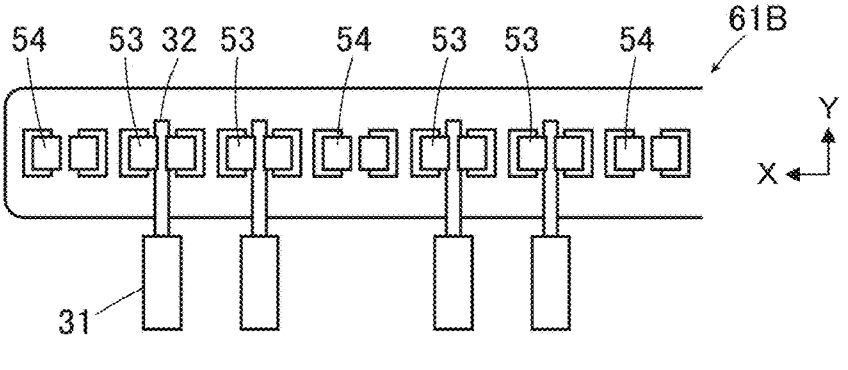
FIG. 26 is a view showing the arrangement of a connector and the electric wires in Arrangement Example 2 of Embodiment 3.

In a connector 61B shown in FIG. 26, the locking spring member 54 is disposed on each of the opposite sides, in the X direction, of every two connecting spring members 53 arranged in series in the X direction. Although not shown in FIG. 26, the electric wire retaining portions 43 and the locking projections 44 are also arranged in the X direction to correspond to the connecting spring members 53 and the locking spring members 54.

Even with this arrangement, the fitting state of the connector 61B is locked by the locking spring member 54 for every two connecting spring members 53, and the contacting portions 23A of the sheet type conductive member 21 can be electrically connected to the conductor portions 32 of the coated electric wires 31 by means of the connecting spring members 53 with high reliability.

Arrangement Example 3

Figure 27:
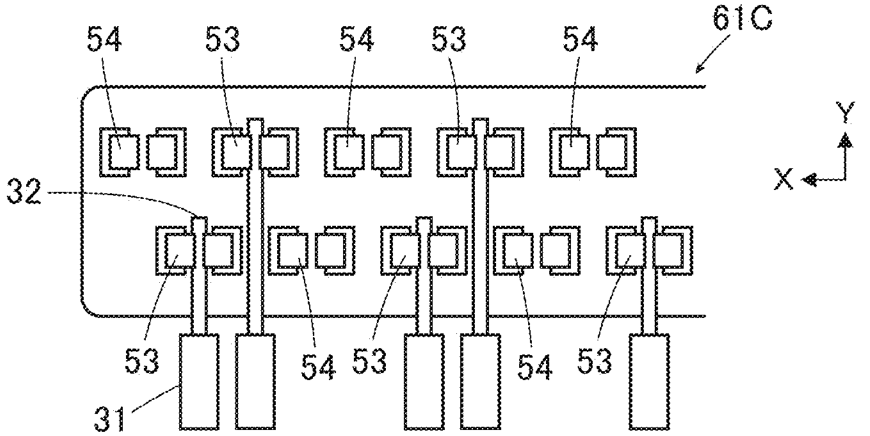
FIG. 27 is a view showing the arrangement of a connector and the electric wires in Arrangement Example 3 of Embodiment 3.

In a connector 61C shown in FIG. 27, the connecting spring members 53 and the locking spring members 54 are arranged in the X direction in two rows at a distance in the Y direction and staggered in the Y direction. In each row, the connecting spring members 53 and the locking spring members 54 are alternately arranged in the X direction. Although not shown in FIG. 27, the electric wire retaining portions 43 and the locking projections 44 are also arranged to correspond to the connecting spring members 53 and the locking spring members 54.

Since the connecting spring members 53 and the locking spring members 54 are staggered in the Y direction, the coated electric wires 31 can be arranged on the −Y direction side of the connector 61C such that their conductor portions 32 extend to the corresponding connecting spring members 53.

This arrangement makes it possible to connect the conductor portions 32 of a large number of coated electric wires 31 to the sheet type conductive member 21.

Arrangement Example 4

Figure 28:
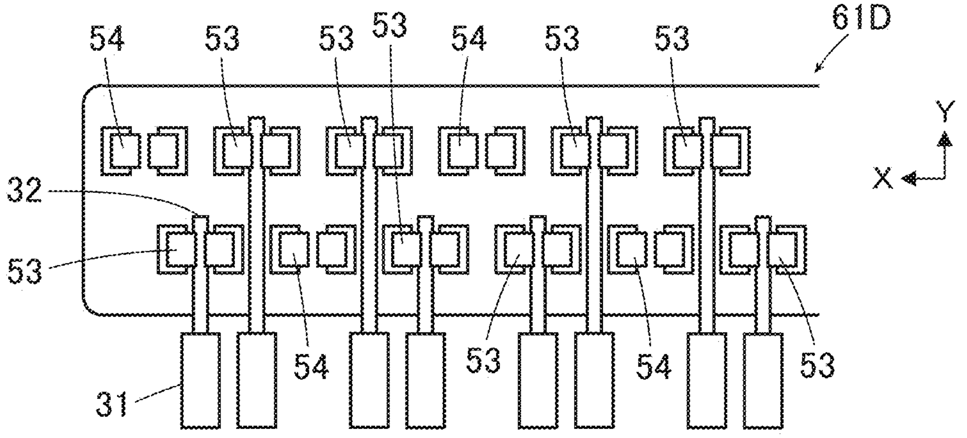
FIG. 28 is a view showing the arrangement of a connector and the electric wires in Arrangement Example 4 of Embodiment 3.

In a connector 61D shown in FIG. 28, the connecting spring members 53 and the locking spring members 54 are arranged in the X direction in two rows at a distance in the Y direction and staggered in the Y direction, similarly to the connector 61C shown in FIG. 27. In each row, however, the locking spring member 54 is disposed on each of the opposite sides, in the X direction, of every two connecting spring members 53 arranged in series in the X direction. Although not shown in FIG. 28, the electric wire retaining portions 43 and the locking projections 44 are also arranged to correspond to the connecting spring members 53 and the locking spring members 54.

Even with this configuration, since the connecting spring members 53 and the locking spring members 54 are staggered in the Y direction, the coated electric wires 31 can be arranged on the −Y direction side of the connector 61D such that their conductor portions 32 extend to the corresponding connecting spring members 53. Besides, the conductor portions 32 of a large number of coated electric wires 31 can be connected to the sheet type conductive member 21.

Arrangement Example 5

Figure 29:
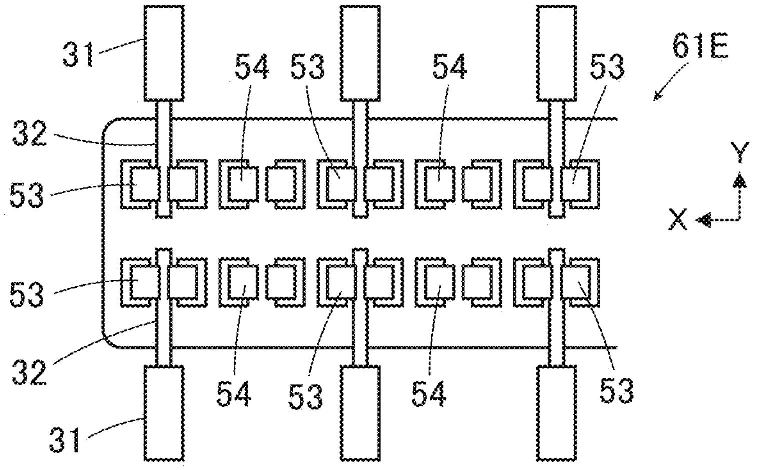
FIG. 29 is a view showing the arrangement of a connector and the electric wires in Arrangement Example 5 of Embodiment 3.

In a connector 61E shown in FIG. 29, the connecting spring members 53 and the locking spring members 54 are arranged in the X direction in two rows at a distance in the Y direction and aligned in the Y direction. In addition, the connecting spring members 53 arranged in, of the two rows, one row are placed in the same X-directional positions as those of the connecting spring members 53 arranged in the other row. Although not shown in FIG. 29, the electric wire retaining portions 43 and the locking projections 44 are also arranged to correspond to the connecting spring members 53 and the locking spring members 54.

Since the connecting spring members 53 and the locking spring members 54 are aligned in the Y direction, the coated electric wires 31 are arranged on each of the +Y direction side and the −Y direction side of the connector 61E.

Even with this arrangement, the conductor portions 32 of a large number of coated electric wires 31 can be connected to the sheet type conductive member 21.

Arrangement Example 6

Figure 30:
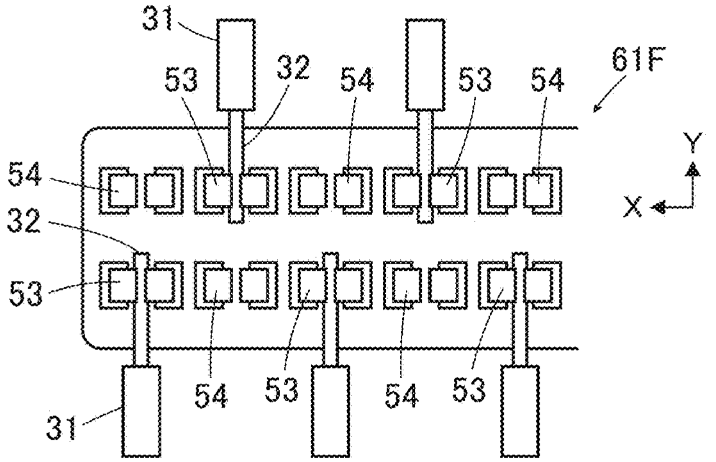
FIG. 30 is a view showing the arrangement of a connector and the electric wires in Arrangement Example 6 of Embodiment 3.

In a connector 61F shown in FIG. 30, the connecting spring members 53 and the locking spring members 54 are arranged in the X direction in two rows at a distance in the Y direction and aligned in the Y direction, similarly to the connector 61E shown in FIG. 29. However, the connecting spring members 53 arranged in, of the two rows, one row and the connecting spring members 53 arranged in the other row are staggered in the Y direction. Although not shown in FIG. 30, the electric wire retaining portions 43 and the locking projections 44 are also arranged to correspond to the connecting spring members 53 and the locking spring members 54.

Also in this case, since the connecting spring members 53 and the locking spring members 54 are aligned in the Y direction, the coated electric wires 31 are arranged on each of the +Y direction side and the −Y direction side of the connector 61F.

Even with this arrangement, the conductor portions 32 of a large number of coated electric wires 31 can be connected to the sheet type conductive member 21.

Arrangement Example 7

Figure 31:
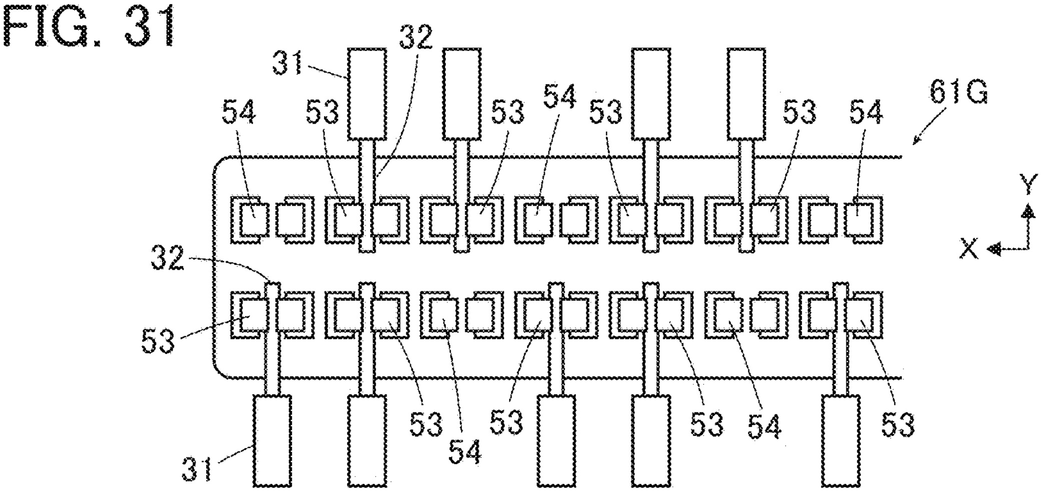
FIG. 31 is a view showing the arrangement of a connector and the electric wires in Arrangement Example 7 of Embodiment 3.

Also in a connector 61G shown in FIG. 31, the connecting spring members 53 and the locking spring members 54 are arranged in the X direction in two rows at a distance in the Y direction and aligned in the Y direction, similarly to the connector 61E shown in FIG. 29. In each row, however, the locking spring member 54 is disposed on each of the opposite sides, in the X direction, of every two connecting spring members 53 arranged in series in the X direction. Although not shown in FIG. 31, the electric wire retaining portions 43 and the locking projections 44 are also arranged to correspond to the connecting spring members 53 and the locking spring members 54.

Also in this case, since the connecting spring members 53 and the locking spring members 54 are aligned in the Y direction, the coated electric wires 31 are arranged on each of the +Y direction side and the −Y direction side of the connector 61G.

Even with this arrangement, the conductor portions 32 of a large number of coated electric wires 31 can be connected to the sheet type conductive member 21.

Arrangement Example 8

Figure 32:
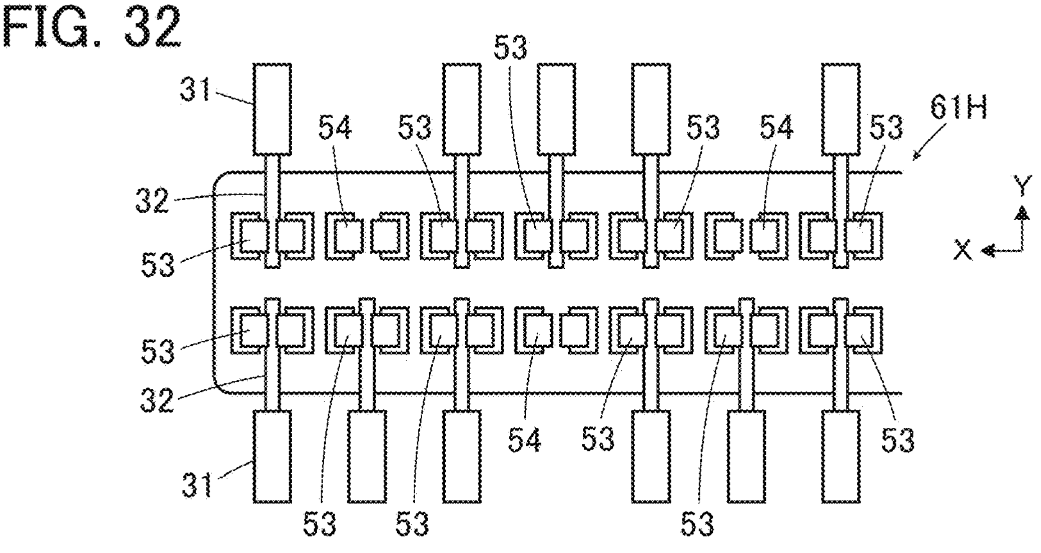
FIG. 32 is a view showing the arrangement of a connector and the electric wires in Arrangement Example 8 of Embodiment 3.
Figure 33:
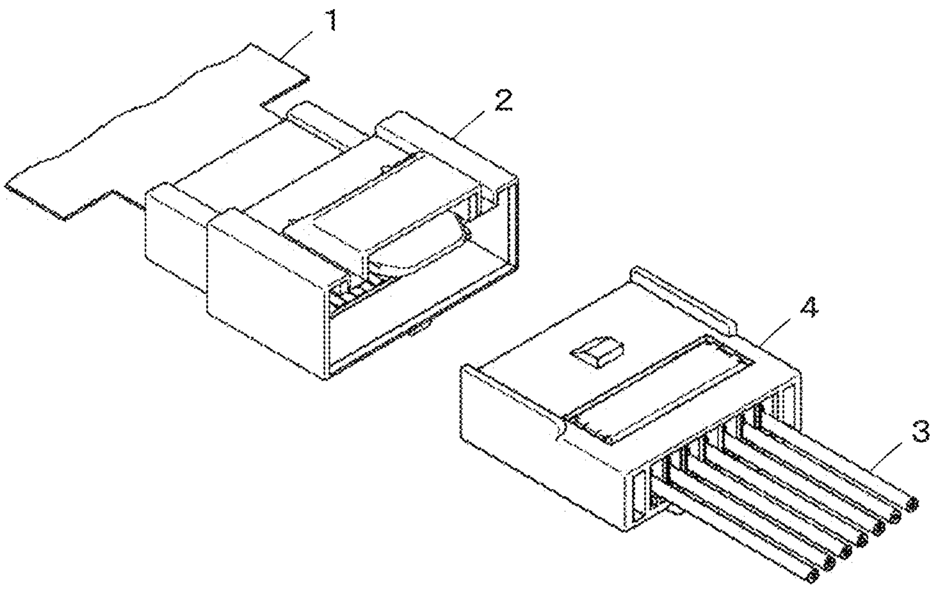
FIG. 33 PRIOR ART
FIG. 33 is a perspective view showing a conventional connector.

Also in a connector 61H shown in FIG. 32, the connecting spring members 53 and the locking spring members 54 are arranged in the X direction in two rows at a distance in the Y direction and aligned in the Y direction. In each row, however, the locking spring member 54 is disposed on each of the opposite sides, in the X direction, of every three connecting spring members 53 arranged in series in the X direction. Although not shown in FIG. 32, the electric wire retaining portions 43 and the locking projections 44 are also arranged to correspond to the connecting spring members 53 and the locking spring members 54.

Since the connecting spring members 53 and the locking spring members 54 are aligned in the Y direction, the coated electric wires 31 are arranged on each of the +Y direction side and the −Y direction side of the connector 61H.

Even with this arrangement, the fitting state of the connector 61H is locked by the locking spring member 54 for every three connecting spring members 53, and the contacting portions 23A of the sheet type conductive member 21 can be electrically connected to the conductor portions 32 of the coated electric wires 31 by means of the connecting spring members 53 with high reliability.

What is claimed is:

1. A connector connecting a conductor portion of an electric wire to a flexible conductor of a sheet type conductive member, the connector comprising:

a first connector portion including an electric wire retaining portion used to retain the electric wire, and a locking projection; and a second connector portion including a connecting spring member corresponding to the electric wire retained by the electric wire retaining portion, and a locking spring member corresponding to the locking projection, wherein the electric wire extends along a first direction, the connecting spring member and the locking spring member are disposed at a predetermined interval in a second direction perpendicular to the first direction, and when the second connector portion is fitted to the first connector portion having the electric wire retained in the electric wire retaining portion with the sheet type conductive member being interposed between the second connector portion and the first connector portion, the flexible conductor of the sheet type conductive member is pressed against the conductor portion of the electric wire by the connecting spring member and electrically connected to the conductor portion, and the locking spring member catches on the locking projection so that a fitting state between the first connector portion and the second connector portion is locked.

2. The connector according to claim 1, wherein the first connector portion is constituted of a first insulator in which the electric wire retaining portion and the locking projection are formed on a top surface of a flat plate portion extending along the first direction and the second direction.

3. The connector according to claim 2, wherein the electric wire retaining portion includes at least a pair of retaining projections that face each other in the second direction and sandwich an outer peripheral portion of the electric wire.

4. The connector according to claim 2, wherein the electric wire retaining portion includes at least one retaining projection provided with an arm portion that extends in the second direction while facing the top surface of the flat plate portion and that holds an outer peripheral portion of the electric wire between itself and the top surface of the flat plate portion.

5. The connector according to claim 1, wherein the second connector portion includes: a second insulator to which the connecting spring member and the locking spring member are attached; and an insulating sheet that is attached to the second insulator to thereby retain the connecting spring member and the locking spring member in the second insulator.

6. The connector according to claim 1, wherein the locking projection includes an overhanging portion overhanging in the second direction, the locking spring member includes a lock piece that is elastically deformable in the second direction, and the lock piece catches on the overhanging portion when the second connector portion is fitted to the first connector portion.

7. The connector according to claim 6, wherein the locking projection includes a pair of the overhanging portions overhanging in opposite directions from each other, and the locking spring member includes a pair of the lock pieces that separately catch on the pair of the overhanging portions.

8. The connector according to claim 1, wherein the connecting spring member includes a pair of spring pieces facing each other in the second direction and presses the flexible conductor of the sheet type conductive member to the conductor portion of the electric wire disposed between the pair of spring pieces.

9. The connector according to claim 2, wherein the first connector portion includes a pair of positioning projections disposed on opposite ends, in the second direction, of the flat plat portion and projecting in a fitting direction in which the first connector portion and the second connector portion are fitted together, and the pair of positioning projections are passed through a pair of positioning holes formed in the sheet type conductive member, whereby the sheet type conductive member is positioned with respect to the first connector portion.

10. The connector according to claim 1, wherein the second connector portion includes a plurality of the connecting spring members and a plurality of the locking spring members arranged in the second direction, the locking spring member is disposed on each of opposite sides, in the second direction, of every one or more connecting spring members arranged in series in the second direction, and the first connector portion has a plurality of the electric wire retaining portions and a plurality of the locking projections that are arranged in the second direction to correspond to the plurality of the connecting spring members and the plurality of the locking spring members.

11. The connector according to claim 10, wherein the second connector portion has the plurality of the connecting spring members and the plurality of the locking spring members arranged in the second direction in two rows at a distance in the first direction, and the first connector portion has the plurality of the electric wire retaining portions and the plurality of the locking projections that are arranged in the second direction in two rows to correspond to the plurality of the connecting spring members and the plurality of the locking spring members.

12. The connector according to claim 11, wherein the plurality of the connecting spring members and the plurality of the locking spring members arranged in the two rows are staggered in the first direction, and the plurality of the electric wire retaining portions and the plurality of the locking projections arranged in the two rows are staggered in the first direction.

13. The connector according to claim 11, wherein the plurality of the connecting spring members and the plurality of the locking spring members arranged in the two rows are aligned in the first direction, and the plurality of the electric wire retaining portions and the plurality of the locking projections arranged in the two rows are aligned in the first direction.

14. A connector assembly comprising:

the sheet type conductive member;

the electric wire; and the connector according to claim 1, wherein the flexible conductor of the sheet type conductive member is pressed against the conductor portion of the electric wire by the connecting spring member and electrically connected to the conductor portion, and the locking spring member catches on the locking projection so that a fitting state between the first connector portion and the second connector portion is locked.

* * * * *